United States Patent [19]

Eskay

[11] 4,388,432
[45] Jun. 14, 1983

[54] REPULPABLE ACRYLIC ACID BASED PRESSURE-SENSITIVE ADHESIVE

[75] Inventor: Robert R. Eskay, Woodbridge, N.J.

[73] Assignee: Permacel, New Brunswick, N.J.

[21] Appl. No.: 330,936

[22] Filed: Dec. 15, 1981

[51] Int. Cl.³ .............................................. C08K 5/05
[52] U.S. Cl. ................................................. 524/388
[58] Field of Search ........................ 525/388; 524/388

[56] References Cited

U.S. PATENT DOCUMENTS

| | | | |
|---|---|---|---|
| 2,780,610 | 2/1957 | Barber et al. | 524/388 |
| 3,865,770 | 2/1975 | Blake | 428/355 |
| 3,983,059 | 9/1976 | Sekmakas | 524/388 |

*Primary Examiner*—Joseph L. Schofer
*Assistant Examiner*—N. Sarofim
*Attorney, Agent, or Firm*—Dressler, Goldsmith, Shore, Sutker & Milnamow, Ltd.

[57] ABSTRACT

A high-temperature shear-resistant, water-dispersible pressure-sensitive adhesive comprising (1) a copolymer of an acrylic acid compound and acrylamide, (2) a plasticizer-tackifier comprising a polyhydric alcohol compound and (3) caustic, and a process for its preparation are described.

11 Claims, No Drawings

REPULPABLE ACRYLIC ACID BASED PRESSURE-SENSITIVE ADHESIVE

Water-dispersible pressure-sensitive adhesive tapes have become an important article of commerce and are used extensively in paper manufacturing and processing industries to provide fast splicing techniques between roll changes or after removing waste sections within a roll of paper. For such uses, the adhesive must have a combination of properties. One essential property is good tack and quick-stick so that a good bond can be formed instantaneously. This is especially important where "flying splicer" is used such as in the printing industry where machine speeds of 2,000 feet per minute are reached. A second important property is good water solubility and repulpability. If the adhesive does not completely dissolve, a spot will occur when paper is made from the redispersed pulp. Spliced webs are often subjected to high shear forces. Web failure at the splice during further processing can produce considerable delay in continuing the operation. Another property is high temperature shear resistance. Many times spliced paper is subjected to high processing temperatures and a tape with good high temperature shear resistance is necessary to provide a continuous operation while the paper is passed through hot drying ovens. Still another property is bleed resistance. Resistance to bleeding of the adhesive is especially important in thin paper when rolls of such paper are stored for extensive periods of time. Any migration of adhesive through the paper can produce not only an unsightly appearance but may also produce blocking between layers which result in tearing when the rolls are unwound. Bleeding may also be caused by migration of plasticizer from the adhesive. This bleeding causes staining and subsequent waste of paper.

A number of patents have been issued teaching various approaches to providing water-soluble pressure-sensitive adhesives. Some of the patents are U.S. Pat. Nos. 2,838,421; 3,441,430; 3,575,911; 3,758,433; 3,865,770; and European Patent No. 22-339-A-3. The general teachings of these patents are to copolymerize an acrylic, methyacrylic, or maleic acid with an acrylate ester. This type of copolymer is then plasticized with a polyhydric alcohol compound. By "polyhydric alcohol compound" is meant polyalkylene glycol, polyalkylene glycol ether, or low or high molecular weight polyhydric alcohol. In these compositions, the plasticizing agent impart tackifying property. Frequently monovalent caustic is added to improve water solubility. Polyfunctional cross-linking compounds, such as hexamethylenediamine or a polyfunctional metal salt such as calcium chloride or aluminum chloride, have been added to improve high temperature shear characteristics. The use of the latter requires an addition for caustic for repulping.

According to the present invention there has been discovered a water-dispersible pressure-sensitive adhesive based on a novel polymeric system which has high temperature shear resistance and which property is achieved without the need for post treatment with polyfunctional cross-linking agents. The adhesive comprises (1) a copolymer of an acrylic acid compound and acrylamide, (2) a plasticizer-tackifier comprising a polyhydric alcohol compound and (3) a minor amount of monobasic caustic. The use of a polymer in which an acrylamide is a comonomer and the inclusion of a minor amount of caustic improves the adhesive properties over known acrylic acid based adhesives so that post treatment is rendered unnecessary.

The copolymer component of the adhesive is preferably a copolymer of from about 85 to 97 percent by weight, preferably 90 to 95 percent, and correspondingly from 15 to 3 percent, preferably 10 to 5 percent of acrylamide. By "acrylic acid compound" is meant acrylic acid or acrylic acid which has been modified up to about 25 percent by weight with another monomer. Suitable monomers are plasticizing monomers, i.e., those having a plasticizing effect on the ultimate polymer backbone. Suitable monomers are those monomers which when polymerized alone gives a glass transition temperature ($T_g$) of less than 0° C. They include alkyl esters of acrylic acid where the alkyl group contains from about 1 to 12 carbon atoms, alkoxyalkyl esters of acrylic acid and alkyl and alkoxyalkyl esters of methacrylic acid. The best performing adhesives are based on polymers having a viscosity at 72° F. of 10,000 to 100,000 centipoises, preferably 10,000 to 30,000 centipoises when measured at 15 percent solids solution in a solvent blend of two parts of water to one part of acetone.

The "plasticizer-tackifier" as herein employed is a polyhydric alcohol compound and is a material which initially has plasticizing properties and provides tackifying properties to the ultimate acrylic acid based adhesives. Suitable polyhydric alcohol compounds include polyalkylene glycol, polyalkylene glycol ethers, polyhydric alcohols and alkanolamines.

By "caustic" as herein employed is meant monobasic alkali such as sodium or potassium hydroxide.

Preferred pressure-sensitive adhesives comprise from 100 to 500 parts, preferably 150 to 250 parts by weight of plasticizer tackifier per 100 parts by weight of copolymer and from 0.5 to 2.5 parts by weight of sodium hydroxide per 100 parts by weight of copolymer. Other bases also may be employed in appropriate weight amounts to provide equivalent basicity. 1.7 percent by weight of sodium hydroxide based on polymer appears to be most useful. Amounts of base higher than 2.5 percent cause the adhesive film to become elastic in nature rather than tacky.

A further modification of the adhesive composition to provide an adhesive with superior properties, especially in highly plasticized (high tack) adhesives is the incorporation of from about 0.5 to 3 percent by weight based on copolymer of a di-tertiary amine. Particularly suitable is triethylenediamine. The inclusion of such amine provides an adhesive with outstanding high temperature shear resistance.

The adhesive composition may be obtained by first preparing the polymer by solution polymerization of a mixture comprising acrylic acid compound and acrylamide in the presence of a free radical catalyst until conversion to the desired copolymer is achieved as determined by percent solids, thereafter adding to the polymerization mixture an appropriate amount of caustic and plasticizer-tackifier.

In carrying the reaction, the appropriate monomers in an amount to provide about 12 to 18 percent total monomer content in an aqueous solvent and 0.1 to 1 percent of catalyst based on total monomer content are placed in a reactor and heated to reflux or in an inert atmosphere to cause polymerization to occur and the heating continued until about 95 percent conversion of the monomer to a polymer is achieved as determined by solids content. Preferred solvent for carrying out the polymerization is a two to one (2:1) water-acetone mixture but other aqueous solvent combinations also may be employed. Any conventional catalyst may be employed; benzoyl peroxide is the most convenient. When water-acetone is the solvent, the reaction usually takes place in the temperature range of from about 70° to 80° C. After completion of the polymerization as evidenced by solids content, aqueous alkali (caustic) and plasticizer-tackifier are added and blended together to produce the desired adhesive which then may be applied to a backing using conventional coating procedures.

If the adhesive composition containing ditertiary amine is prepared, the ditertiary amine may be added at the time of addition of alkali and plasticizer-tackifier, or may be added subsequently after the reaction mixture is allowed to cool.

The following examples illustrate the invention but are not to be construed as limiting:

EXAMPLE I 95 parts of acrylic acid and 5 parts of acrylamide by weight in a 2:1 water-acetone solvent mixture at about 15 percent solids, and about 0.6 part of benzoyl peroxide were placed in a reactor and heated to reflux (74° C.) and maintained at this temperature for about 6 hours. Thereafter the mixture was cooled and 1.7 parts by weight of sodium hydroxide per 100 parts of polymer was added. The resulting polymer composition of 15.12 percent solids content had a viscosity at room temperature of 26,000 centipoises.

The polymer thus obtained was compounded with two parts of polyethylene glycol monoethyl ether of molecular weight of about 270 for each part by weight of the polymer (based on the solid content of the composition) to obtain an adhesive comprising (1) a copolymer of 95 percent by weight of acrylic acid and 5 percent by weight of acrylamide, (2) a plasticizer-tackifier comprising polyethylene glycol monoethyl ether and (3) 1.7 percent of sodium hydroxide.

EXAMPLE II

A control adhesive was prepared in a manner similar to Example I except that the polymer was derived solely from acrylic acid and the polyethylene glycol monoethyl ether plasticizer-tackifier was employed in an amount of 1.5 parts per 1 part of polymer.

EXAMPLE III

A control adhesive was prepared in a manner similar to that described in Example II except that no sodium hydroxide was added.

EXAMPLE IV

An adhesive was produced in a manner similar to that described in Example I except that the polymer was a copolymer of 3.3 parts of acrylamide/5 parts of and 2-ethylhexyl acrylate/91.7 parts of acrylic acid, and the polyethylene glycol monoethyl ether plasticizer-tackifier was employed in an amount of 1.8 parts by weight per 1 part of copolymer.

EXAMPLE V

A control adhesive was prepared in the same manner as Example IV except that no sodium hydroxide was added.

EXAMPLE VI

An adhesive was prepared in a manner similar to that described in Example I except that the polymer was a copolymer of 3.3 parts of acrylamide/5 parts of 2-ethylhexyl acrylate/4.5 parts of 2-ethoxyethyl acrylate/87.2 parts of acrylic acid, and the polyethylene glycol monoethyl ether plasticizer-tackifier was used in an amount of 1.5 parts for every part of copolymer.

EXAMPLE VII

A control adhesive was prepared in a manner as described in Example VI except that no sodium hydroxide was added.

EXAMPLE VIII

An adhesive was produced in a manner similar to that described in Example IV except that 4 parts of the polyethylene glycol monoethyl ether plasticizer-tackifier was employed for every part of copolymer.

EXAMPLE IX

An adhesive was produced in a manner similar to that described in Example VIII except that one part of triethylenediamine was added for 100 parts of polymer.

The adhesives were then coated on a sheet of commercially obtained calendered kraft paper, dried and slit to one inch strips for evaluation. Each strip was laminated with a four and a half pound rubber covered roller to a one inch strip of bond paper in a manner to form a one square inch area of overlap. The strips were then subjected to a shear stress of 500 grams and 1 kilogram in a 325° F. oven to determine high temperature shear resistance. The test was carried out by suspending the strips from a bar and putting the appropriate weight at the bottom of the strip and determining the time of hold. A time of more than 5 minutes at a 500 gram load is considered good. A time of more than 5 minutes at a 1 kilogram load is considered excellent. (If a bond holds for more than 5 minutes, it normally holds until the paper tears). The results of the evaluation are found in Table I.

TABLE I

| Example | Bonding Time at 325° F. | |
|---|---|---|
| | 500 grams/square inch | 1 kilogram/square inch |
| I | 5+ minutes | 5+ minutes |
| II | 30 seconds | less than 5 seconds |
| III | 10 seconds | less than 5 seconds |
| IV | 5+ minutes | 5+ minutes |
| V | 10 seconds | less than 5 seconds |
| VI | 5+ minutes | 5+ minutes |
| VII | 30 seconds | less than 5 seconds |
| VIII | 5+ minutes | 10 seconds |
| IX | 5+ minutes | 5+ minutes |

I claim:
1. A high-temperature shear-resistant, water-dispersible pressure-sensitive adhesive comprising (1) a copolymer of from about 85 to about 97 percent by weight of acrylic acid compound and from about 15 to about 3 percent by weight of acrylamide, said acrylic acid compound including at least about 75 weight percent acrylic acid and about 25 to about 0 weight percent of a plasticizing monomer, (2) a plasticizer-tackifier comprising a polyhydric alcohol compound in an amount of from about 100 to 500 parts for every 100 parts of copolymer and (3) from about 0.5 to 2.5 percent based on copolymer of caustic.

2. An adhesive according to claim 1 in which a di-tertiary amine has been included in an amount of from about 0.5 to 3 percent by weight of the copolymer.

3. A process for producing a high-temperature shear resistant, water-dispersible pressure-sensitive adhesive comprising (1) a copolymer of from about 85 to about 97 percent by weight of acrylic acid compound and from about 15 to about 3 percent by weight of acrylamide, (2) a plasticizer-tackifier comprising a polyhydric alcohol compound in an amount of from about 100 to 500 parts for every 100 parts of copolymer and (3) from about 0.5 to 2.5 percent based on copolymer of caustic, which comprises
  (1) heating together an acrylic acid compound and acrylamide in an aqueous solvent in the presence of a free radical catalyst to obtain the copolymer, said acrylic acid compound including at least about 75 weight percent acrylic acid and about 25 to about 0 weight percent of a plasticizing monomer, and
  (2) compounding the copolymer with a plasticizer-tackifier comprising a polyhydric alcohol compound and caustic.

4. A high-temperature shear-resistant, water-dispersible pressure-sensitive adhesive comprising (1) a copolymer of from about 90 to about 95 weight percent of acrylic acid compound and about 10 to about 5 percent by weight acrylamide, said acrylic acid compound including at least about 75 weight percent acrylic acid and about 25 to about 0 weight percent of a plasticizing monomer, (2) a plasticizer-tackifier comprising a polyhydric alcohol compound in an amount of from about 100 to about 500 parts for every 100 parts of copolymer and (3) from about 0.5 to about 2.5 percent based on copolymer of caustic.

5. An adhesive according to claim 2 wherein said di-tertiary amine is triethylenediamine.

6. A pressure-sensitive adhesive tape comprising the pressure-sensitive adhesive of claim 1 applied to a backing.

7. A pressure-sensitive adhesive tape comprising the pressure-sensitive adhesive of claim 2 applied to a backing.

8. A pressure-sensitive adhesive tape comprising the pressure-sensitive adhesive of claim 4 applied to a backing.

9. A laminate comprising the pressure-sensitive adhesive of claim 1 between two paper sheets.

10. A laminate comprising the pressure-sensitive adhesive of claim 2 between two paper sheets.

11. A laminate comprising the pressure-sensitive adhesive of claim 4 between two paper sheets.

* * * * *